United States Patent
Winzer

[11] 3,902,175
[45] Aug. 26, 1975

[54] METHOD AND APPARATUS FOR PHASE INTEGRATION OF RADAR PULSE TRAINS

[75] Inventor: Gerhard Winzer, Munich, Germany

[73] Assignee: Siemens Aktiengesellschaft, Berlin & Munich, Germany

[22] Filed: Oct. 13, 1972

[21] Appl. No.: 297,306

[30] Foreign Application Priority Data
Sept. 29, 1971 Germany............................ 2148650

[52] U.S. Cl................... 343/17.1 R; 340/173 LM
[51] Int. Cl............................................. G01s 7/32
[58] Field of Search.......... 343/17.1 R, 5 PC; 356/5; 340/173 LM, 174.1 M; 178/6.7 A

[56] References Cited
UNITED STATES PATENTS

| | | | |
|---|---|---|---|
| 2,836,359 | 5/1958 | Mazzagatti | 343/17.1 R |
| 3,113,311 | 12/1963 | Searle et al. | 343/17.1 R |
| 3,115,629 | 12/1963 | Plaistowe et al. | 343/17.1 R |
| 3,229,273 | 1/1966 | Baaba et al. | 340/174.1 M |
| 3,400,363 | 9/1968 | Silverman | 340/173 LM |
| 3,417,381 | 12/1968 | Sincerbox | 340/173 LM |
| 3,427,104 | 2/1969 | Blikken et al. | 356/5 |
| 3,454,414 | 7/1969 | Andes et al. | 340/173 LM |

*Primary Examiner*—Maynard R. Wilbur
*Assistant Examiner*—G. E. Montone
*Attorney, Agent, or Firm*—Hill, Gross, Simpson, Van Santen, Steadman, Chiara & Simpson

[57] ABSTRACT

A method and apparatus for detecting weak signals in the presence of noise wherein a repetitive radar signal is integrated over a relatively long time such that the intelligence in the echo signal gradually builds up in a memory and which can then be read out to recover the intelligence. In one embodiment photochromium memories are used which supply an output to an analog computer and in a second embodiment the storage medium is a polarization rotating crystal as for example a KDP crystal.

6 Claims, 19 Drawing Figures

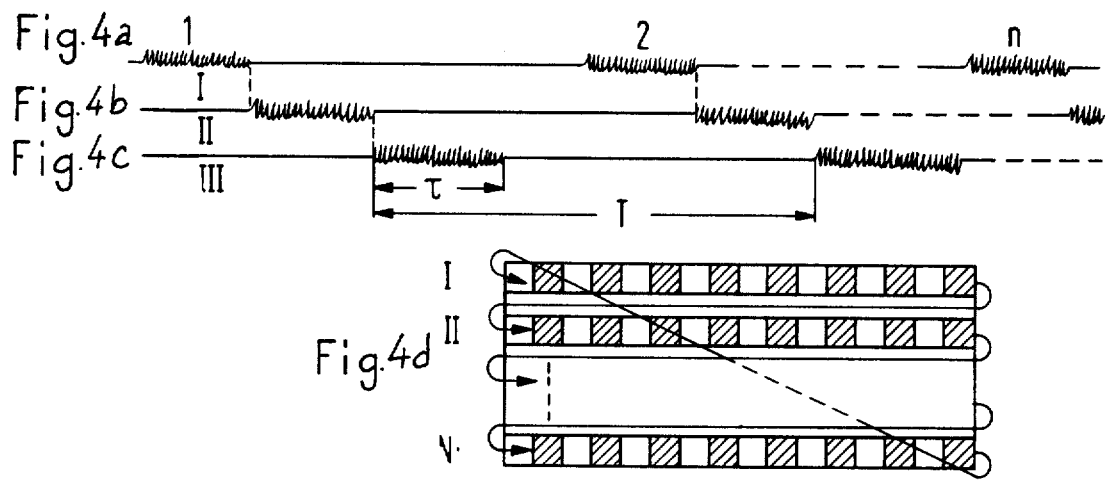
Fig. 4a
Fig. 4b
Fig. 4c
Fig. 4d
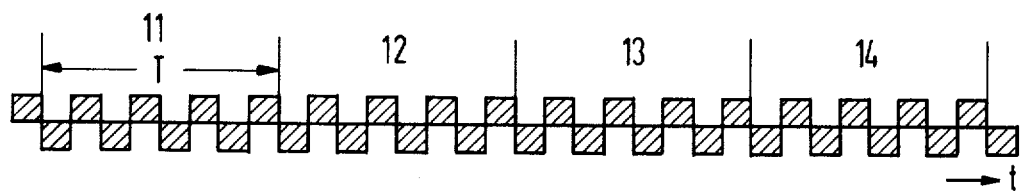
Fig. 5a
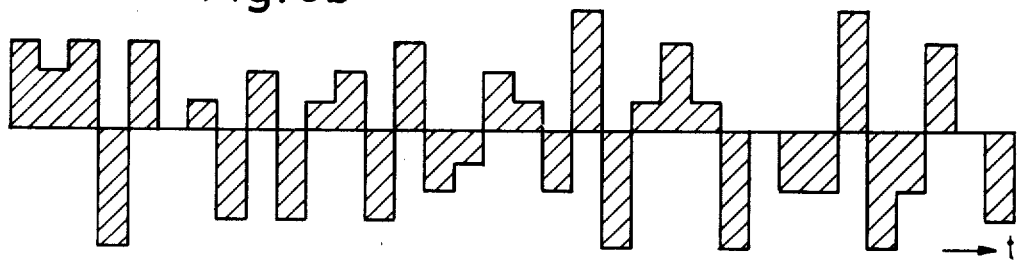
Fig. 5b
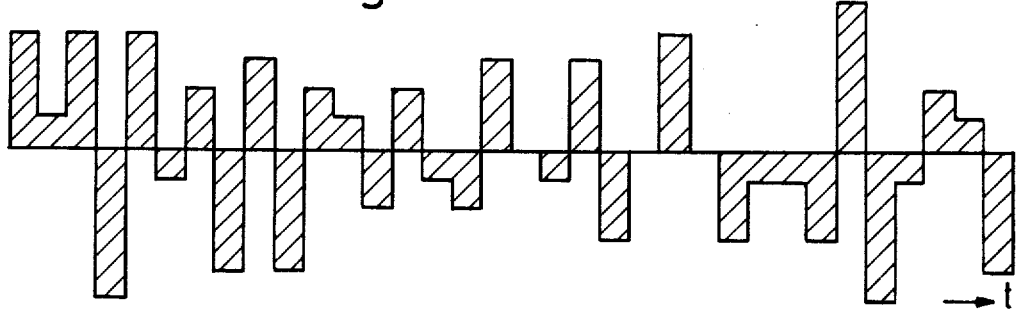
Fig. 5c

METHOD AND APPARATUS FOR PHASE INTEGRATION OF RADAR PULSE TRAINS

BACKGROUND OF THE INVENTION

1. Field of the Invention

This invention relates in general to a method and apparatus for detecting repetitive type intelligence in the presence of noise, and in particular to an improved detector utilizing optical memories.

2. Description of the Prior Art

Detection of radar signals in strong interference has previously been accomplished by increasing the radiated signal energy by the technique known as "burn through" and such technique is described in *Space Aeronautics*, Vol. 33, No. 4, 1966, at pages 134 to 137. The detected signal is separated from noise by in-phase addition of the echoes and if a sufficiently long observation period is used, the signal will build up to a level such that it is greater than the noise. The noise energy tends to cancel over an integrating period. Such systems utilize core memories which have a system limiting effect. If very weak signals are being detected which have amplitudes that are small compared to the average noise level, the number of cycles of signals must be greatly increased in order to obtain a detectable signal after in-phase integration of the signals. The increase of storage capacity in electronic memories results in very expensive devices.

SUMMARY OF THE INVENTION

The present invention comprises a method and apparatus for in-phase integrating weak echo signals, as for example, radar signals, whereby the echo signals are integrated over a relatively large number of periods and stored in optical memories having great capacity and which are inexpensive. The method and apparatus of the invention allows signals to be detected in very low signal to noise ratios. The pulse echo train is converted into a position function from a time function and is then stored in a two-dimensional reversible optical intermediate multi-channel memory and is then Fourier transformed by an optical analog computer. The transformation of the time function into a position function is accomplished with the aid of a coordinate transformation in such a way that the amplitude distribution of the time function occurs as a spatial transmission distribution on an optical storage material.

Then, the transformation of the position function into a subsequent Fourier transformation is accomplished with the aid of a space frequency analyzer.

Photochromium film or polarizing rotating crystals may be utilized as the intermediate optical multichannel memories.

When photochromium memories are utilized it is desirable to divide the pulse train which includes noise signal and pulse echo signals into two pulse trains having positive and negative amplitude values by means of a fork circuit and to record the positive and negative pulse trains in two separate photochromium memories.

The recorded information which is stored in the two separate photochromium memories may then be evaluated on a parallel basis in a joint optical space frequency analyzer.

If a polarization rotation crystal is utilized as the memory it is advantageous to apply the position function as a charge profile to the polarization rotating crystal and to pass linear polarized coherent light beam through the crystal and to evaluate the transmitted signals in a space frequency analyzer.

Other objects features and advantages of the invention will be readily apparent from the following description of certain preferred embodiments thereof taken in conjunction with accompanying drawings although variations and modifications may be effected without departing from the spirit and scope of the novel concepts of the disclosures and in which:

BRIEF DESCRIPTION OF THE DRAWINGS

FIGS. 4a-4d illustrate the distance channel in a two-dimensional photochromium memory;

FIG. 5a is a graphical representation of four pulse trains under ideal noise condition;

FIG. 5b is a plot of noise superimposed on the intelligence signals;

FIG. 5c is a plot of the signal actually available at the input of the radar system;

DESCRIPTION OF THE PREFERRED EMBODIMENTS

Figure 1A:
FIG. 1a illustrates the train radar electrical echo signal.

FIG. 1a is a plot of a train of radar echo signals plotted as a function of time and it is to be noted that a plurality of echoes are received during each time interval.

Figure 1B:
FIG. 1b illustrates the radar train converted into a position function by means of coordinate transformation.
Figure 1C:
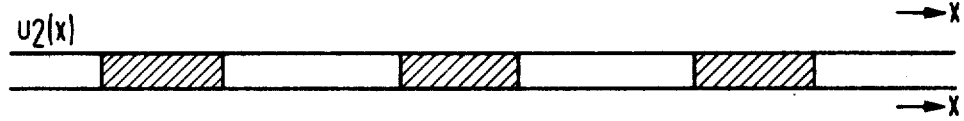
FIG. 1c illustrates the output of an optical memory material.

FIG. 1b is a plot of the train of radar signals which have been converted into a position function by means of a coordinate transformation. Because optical memory material will only register intensities, the phase information of the time function would be lost during a direct transformation if the radar pulse train were not converted into a position function. FIG. 1c illustrates an intensity wise representation $u_2(x)$ which would be produced by the radar signal if the position function were not utilized.

Thus, in order to also store the phase information, a coordinate transformation of the function of $u(t)$ to $u(x)$ will be accomplished in a manner as described in this application in such a manner that the amplitude distribution $u_1(x)$ is available in the form of a transmission distribution on optical carrier material which may be utilized as an input signal into an optical analog memory. The advantage of the optical method is that many channels can be utilized for parallel transformation of functions $u_{11}(x) \ldots u_{1l}(x)$ without additional expense. When utilizing a stabilized pulse repetition frequency it is possible to store echoes from a target which is at rest or a target which is moved with a constant radial speed. If the optical material has a linear response to signal amplitude a desired signal integration can be accomplished.

Figure 2A:
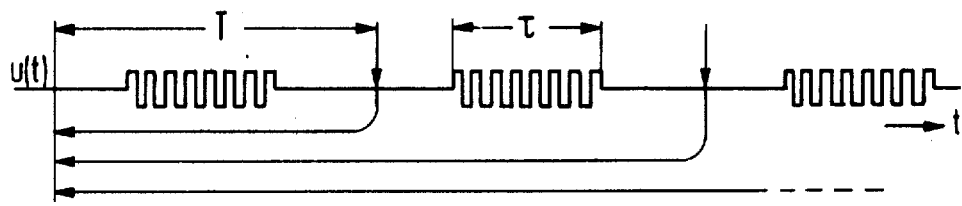
FIG. 2a illustrates a plurality of radar pulse trains.

FIG. 2a illustrates the pulse train $u(t)$ which occurs in the pulse repetition time and wherein the length of the pulse train is $\tau$.

Figure 2B:
FIG. 2b illustrates position function of a individual pulse train.
Figure 2C:
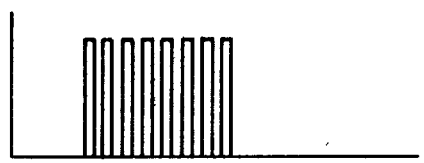
FIG. 2c illustrates the graphical representation of in-phase integration of a large number of pulse trains according to FIG. 2b.

FIG. 2b is a graphical representation of the position function of the individual pulses of the pulse train $u_1(x)$ and FIG. 2c is a graphic representation of an in-phase integration of a large number of pulse trains as seen by the substantial increase in amplitude of the pulses of FIG. 2c.

With the use of a two-dimensional memory a single evaluation channel of the optical analog computer can be associated with each distance channel of the radar system. In the present invention, the principal suitable storage mediums are photochromium films and polarization rotating crystals. The photochromium film can be written on by a light dot recorder whereby an intensity recordation occurs and the polarization rotating crystal can be written on by an electron beam whereby the recordation of a charge profile will occur.

Figure 3:
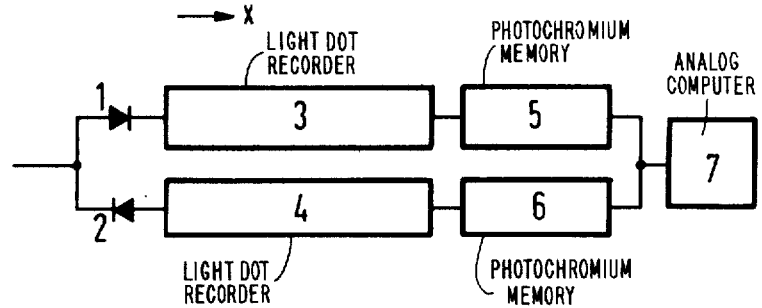
FIG. 3 is a schematic view of a detector device according to this invention.

If the photochromium film is supplied as optical storage material, the echo signal will have to be applied through a fork circuit such as shown in FIG. 3. The input signals are applied to a pair of diodes 1 and 2 with the diode 1 poled so as to pass positive pulses and the diode 2 poled to pass negative pulses. A light dot recorder 3 receives the positive pulses from the diode 1 and supplies an input to a first photochromium memory 5 wherein the positive pulses are recorded and successive pulse inputs are applied so as to integrate the intelligence signal.

A second light dot recorder 4 receives an input from the diode 2 and supplies an input to the photochromium memory 6 to record the negative pulses in the input. An analog computer 7 is connected to receive parallel inputs from the memories 5 and 6 so as to evaluate the intelligence at the end of each information cycle for the two separate channels.

FIGS. 4a through 4d illustrate the arrangement of the distance channel in a two-dimensional photochromium memory. Each distance channel I . . . N corresponds to an evaluation channel of the optical memory and each channel is periodically written on during the observation time at the pulse repetition frequency $f_r$.

An optical diffraction grating lattice of equal grating constant will be produced in each of the two associated memories 5 and 6 and the phase shift between two gratings amounts to 180° or $\pi$. The two signals can be combined to become one joint electrical output signal by utilizing two separate narrow photo detectors which are arranged for instance at the face of the first diffraction order of the gratings.

The different forms of the signal are illustrated in FIGS. 5a through 5c. Curve 5a illustrates graphically the situation for a signal which has zero noise which is subdivided to four partial signals 11, 12, 13 and 14 respectively of duration T. Curve 5b illustrates an interference signal which has been superimposed on the intelligence signals. Curve 5c illustrates the superimposed interfering signal and intelligence signal as it is actually available at the input of the radar system. The principle of in-phase addition consists of adding the partial signals corresponding to their place in the time T, thus for example, the signal appearing during the first time interval and signal 11 will be added to the first signal appearing in the interval 12 and interval 13 and interval 14 respectively, and so forth.

Figure 6A:
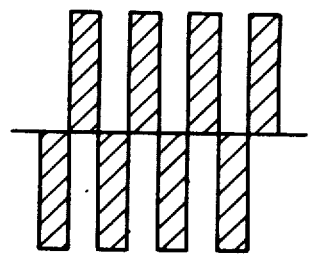
FIG. 6a is a plot of the ideal integrated signal wherein no noise is present.
Figure 6B:
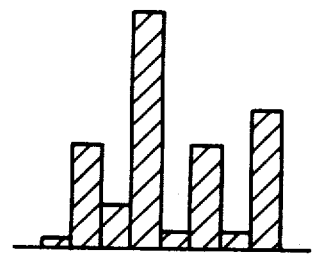
FIG. 6b illustrates the energy in the positive value memory.
Figure 6C:
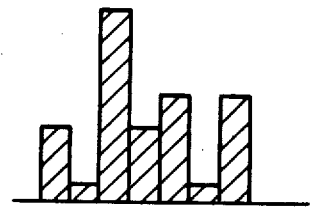
FIG. 6c illustrates the integrated signal in the negative value memory.

This addition is illustrated in FIG. 6a which is for the situation corresponding to FIG. 5a where there is zero noise assumed. The fork or dividing circuit which separates the positive and negative pulses in the apparatus of FIG. 3 results in the positive and negative pulses which are added to obtain the signals illustrated in FIG. 6b and FIG. 6c respectively. Thus, the photochromium memories 5 and 6 illustrated in FIG. 3 will have corresponding blacking paths corresponding to FIGS. 6b and 6c in the intensity sensitive photochromium material which will have a shape of an optical defraction grating.

In the present invention, the interfering signal is also added with the intelligence signal and the total interference signal is not small with respect to the intelligence signal over a long observation time; however, the interfering signal will assume an almost constant direct value which is superimposed on the in-phase added intelligence signal which occurs as an alternate signal. The variation of the added interference signal only depends on the order of the average instantaneous value of the interference signal and the direct portion and the alternate portions are spatially separated from each other in the space frequency plane.

The optical storage material must have a very large control range for this type of in-phase addition since half the sum of the interference intensities must be integrally stored over the entire observation time in each channel.

Figure 7:
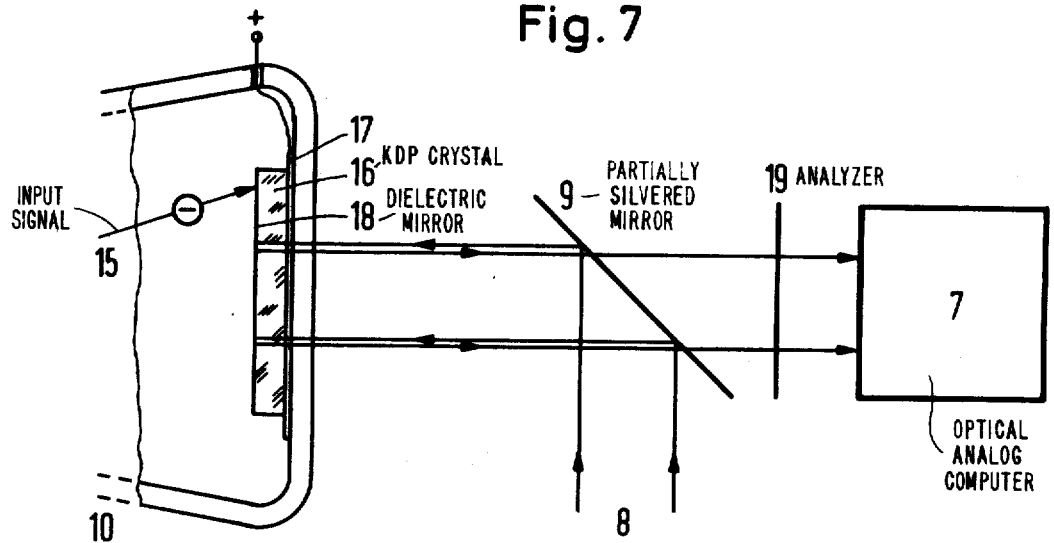
FIG. 7 is a partially schematic view illustrating a storage means using a polarization rotating crystal.

FIG. 7 illustrates a modification of the invention wherein a polarization rotating crystal is utilized as the electro-optical two-dimensional direct time converter. A scanning electron tube 10 has a beam 15 which scans a polarization rotating crystal as for example a KDP crystal (see *Applied Physics Letters*, Vol. 17, No. 2, 1970, pages 63–65). The electron beam 15 converts the time function $u(t)$ into a position function $u(x)$ which is written into the KDP crystal 16 which might for example have a thickness of approximately 30 microns. The signal is written into the crystal as a charge profile.

The crystal is coherently illuminated by plane wave of light 8 by means of a partially silvered mirror 9 which reflects the light wave into the crystal 16 where it encounters a dielectric mirror 18 after passing the crystal 16 which reflects the light energy back through the crystal. The linearly polarized light 8 will experience a polarization rotation corresponding to the charge distribution produced by the writing beam 15 due to the Pockels effect during its passage through the crystal. The light beam then passes from the crystal through the mirror 9 and through an analyzer 19 which allows only rotated light to reach the adjacent optical analog computer 7.

A transparent electrode 17 is mounted between the crystal 16 and the end plate of the tube 10 and a suitable positive voltage is applied to the electrode 17.

By means of writing a number of times on a line the positive and negative interference amplitudes will compensate during recording of the charge profile of the interfering signal as long as the observation time is sufficiently long. This storage tube thus accomplishes a real in-phase addition of the signal amplitudes. With a suitable analyzer position, the reflected light may be respectively blocked for the positions belong to $u(t) \triangleq$ T minimum or the positions belonging to $u(t) \triangleq$ T maximum. If the analyzer position is selected in such a way that the zero passages of $u(t)$ are blocked, a grating with bisected grating constant will be obtained. The halfway voltage of the polarization rotated crystal is in principle limited by the maximum contrast ratio which can be obtained and this also limits the dynamic response of the method. This limitation must be considered where very large noise amplitudes occur.

Figure 8:
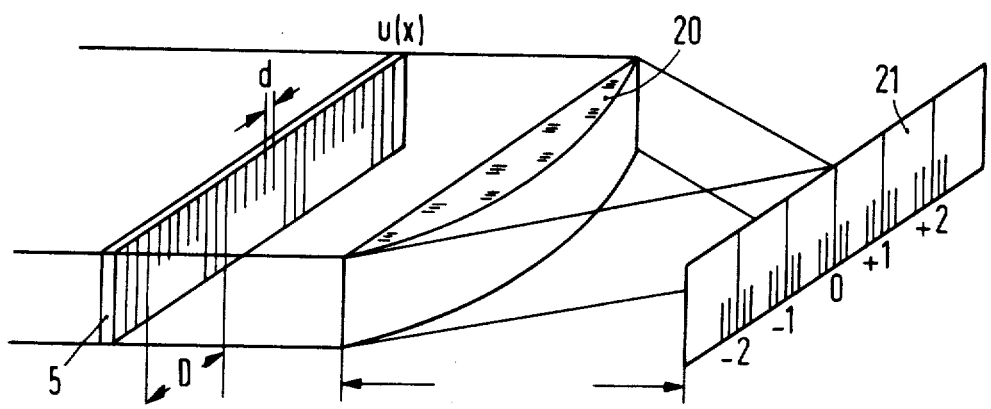
FIG. 8 illustrates an embodiment of an optical analog computer.

FIG. 8 illustrates, schematically, apparatus for processing the diffraction gratings produced on the optical memory. The position function $u(x)$ for example on the photochromium material 5 is here illustrated in the form of a line grating with grating constant $d$ which is superimposed on a pulse signal of equal grating constant at the pulse distance D. The optical analog computer 20 in a simple case may consist of an optical space frequency spectrum analyzer as for example a cylindrical lens. The space frequency spectrum analyzer will record the Fourier transformation of the position function $u(x)$ with a grating constant d on a screen 21 in a manner analogous to that in which an electronic spectrum analyzer records the Fourier transformation on an oscilloscope with respect to the time function $u(t)$. The advantage of the optical method of the present invention is that a great many of channels can be realized for the parallel transformation of functions $u_{11}(x) \ldots u_{1l}(x)$ without additional expense.

A cylindrical lens 20 is used for the Fourier transformation and it produces the Fourier spectrum of the function $u_1(x)$ in the back focal plane during coherent and parallel illumination of the line grating. If the unpulsed function is superimposed with a pulse function with the same grating constant $d$, in other words a function which has the same carrier frequency in the transform sense, the frequency band of the following pulse trains of the echo signals will appear in each one of the defraction orders associated with the grating constant $d$.

In other words, the present invention allows the integration of a repetitive pulse train type of information in a manner such that the signal may be detected in low signal to noise conditions due to the utilization of optical memories.

Although the invention has been described with respect to preferred embodiments thereof, it is not to be so limited as changes and modifications may be made which are within the full intended scope as defined by the appended claims.

I claim as my invention:

1. The method of reducing noise in radar echo pulses by in-phase integration of echo pulses which are produced during multiple sensing of radar targets comprising the steps of
   a. separating said echo pulses into positive and negative amplitude signals,
   b. storing the squares of said positive amplitude signals in a first two dimensional reversible intermediate optical carrier material memory,
   c. storing the squares of said negative amplitude signals in a second two dimensional reversible intermediate optical carrier material memory,
   d. transforming by Fourier transforms the contents of said first and second memories by an optical analogue computer and wherein the echo pulses of a given number of sensing processes are added in said first and second memories and said first and second memories convert said echo pulses into position functions by making a coordinate transformation wherein the amplitude distribution is represented by a spatial distribution.

2. The method according to claim 1 wherein said transforming by Fourier transforms of the position function is effected by a space frequency analyzer.

3. The method according to claim 2, wherein said optical intermediate multi-channel memory is, a photochrome film.

4. The method of claim 1 wherein said optical analogue computer is a joint optical space frequency analyzer.

5. The method according to claim 1, wherein the position function is applied as a charge profile on a polarization-rotated crystal and said charge profile is scanned with a linearly polarized coherent light beam.

6. The method according to claim 1, wherein optical intermediate multi-channel memories, a polarization-rotated crystal is used.

* * * * *